2,997,380
CONTROL OF AQUATIC PLANTS
Melvin Jay Josephs, Midland, Mich., assignor to The Dow Chemical Company, Midland, Mich., a corporation of Delaware
No Drawing. Filed June 6, 1957, Ser. No. 663,896
4 Claims. (Cl. 71—2.3)

This invention relates to herbicides and is particularly concerned with a composition and method for killing aquatic plants. The expression "aquatic plants" as herein employed refers to vegetative organisms normally growing in water and in which the leaf and stem parts are largely submerged. The expression is inclusive of water plants which are not rooted such as Ceratophyllum spp. (coontail), and rooted aquatic weeds such as Anacharis spp. (water weed), Vallisneria spp. (tapegrass), and Potamogeton spp. (pond weed).

Aquatic plants growing out of place are commonly called weeds, and millions of dollars are expended annually for their control. In irrigation ditches, ponds, lakes, canals, rivers and streams of commerce, these plants hinder the flow of water and cause excessive sedimentation. Further, such growth will result in high water loss from evaporation and interfere with navigation. Mechanical operations, such as dredging, chaining, burning and mowing are still a principal means of control. More recently efforts have been made at chemical control. The shortcomings of the latter methods have included superficial burning of exposed leaves without the complete killing of the roots so as to permit the quick regrowth of the plants. Further, many of the proposed materials are as toxic to terrestrial plants as they are to aquatic plants so that the treated water is unsuited for the irrigation of terrestrial crop plants. Also, many of the chemicals are specific in their action and control only a few species, thus leading to increased growth activity on the part of unaffected plants.

It is an object of the present invention to provide a new and improved method for the control and suppresion of the growth of aquatic plants. Another object is the provision of a method for the treatment of the water adjacent to aquatic plants in a pond or stream to control the growth of the plants. A further object is the provision of a method which will control the growth of a large variety of aquatic plant species. An additional object is the provision of novel compositions to be employed in the new methods for suppressing the growth of aquatic plants. Other objects will be come apparent from the following specification and claims.

According to the present invention, it has been found that the phenylphenols having the formulae

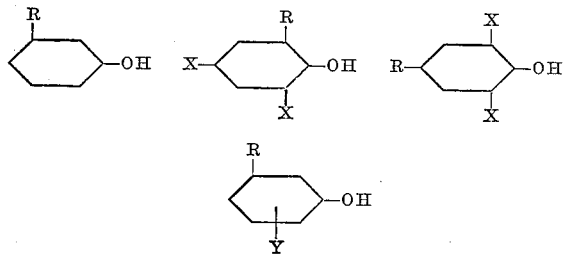

wherein R represents phenyl, each X represents chlorine or hydrogen, and Y represents chlorine and occupies one of the positions ortho and para to the hydroxyl group, are very toxic to aquatic plants. When such a compound, or a composition in which it is employed, is introduced into water adjacent to the submersed viable portions of aquatic plants, a quick kill of the stems and leaves results, accompanied by the control in a short period of time of the roots.

The compounds as employed in accordance with the present invention are crystalline solids somewhat soluble in many organic solvents and of very low solubility in water. They are adapted readily and conveniently to be distributed in water to control aquatic weeds, and have been found to have very low toxicity to terrestrial plants even in large doses. A particular advantage of the present invention is the wide range of water temperatures over which the compounds are effective. Thus, the treatment can be carried out at almost any water temperature which will permit the growth and development of aquatic plants. A still further advantage of the methods and compositions of the invention is their ability to control a wide variety of aquatic plants.

The distribution in water adjacent to growing aquatic plants of a dosage of the phenylphenol compounds effective to kill the plants is essential for the practice of the present invention. In general, good results are obtained when the compounds are distributed in the water adjacent to the plants in an amount of from about 15 to 400 parts or more by weight per million parts of water. The exact dosage to be employed is dependent upon the plant mass to be treated and whether or not the exposure is carried out in a moving stream such as a canal or in standing water such as a pond. In standing water, good results are obtained when employing minimal dosages of the phenylphenol compounds. In moving streams, somewhat higher concentrations are required in order to provide the contacting of the plant with a herbicidal amount of the phenylphenol compounds.

The method of the present invention may be carried out by distributing a growth inhibiting amount of the phenylphenol compounds or a composition containing the compounds in the water adjacent to the growing plants. In such usage, the phenylphenol compounds may be modified with one or more of a plurality of additaments or herbicide adjuvants including water, organic solvents, surface-active dispersing agents and finely divided inert solids. Preferred compositions of the present invention comprise emulsifiable liquid concentrates and wettable powder concentrates. Such concentrates are adapted readily and conveniently to be distributed in water adjacent to aquatic plants to provide in the water growth inhibiting concentrations of the penhylphenol compounds.

The exact concentration of the phenylphenol compounds to be employed in the compositions for the treatment of aquatic plant infested loci is not critical and may vary provided the required dosage of the phenylphenol compounds is supplied in the water adjacent to the plants. The concentration of the phenylphenol compounds in liquid and powder concentrates employed to supply the desired dosage is generally from about 10 to 95 percent by weight.

Liquid compositions containing the desired amount of the phenylphenol compounds may be prepared by dissolving the compounds in one or more organic liquids such as benzene, acetone, chlorobenzene, toluene, methylene chloride, chloronaphthalenes and petroleum distillates, or by dispersing the toxicant compounds in water with the aid of a suitable surface-active dispersing agent. The aqueous compositions may contain one or more water-immiscible organic solvents for the phenylphenol compounds. In such compositions, the carrier comprises an aqueous emulsion, that is, a mixture of water-immiscible solvent, emulsifying agent and water. The compositions should be characterized by a density only slightly greater than water and should contain sufficient of the dispersing and emulsifying agent to make the composition self-dispersing in water to give a milky dispersion which thereafter breaks to permit the settling out of the solution of the phenylphenol compounds.

In the preparation of wettable powder compositions, the phenylphenol compounds are dispersed in and on a finely divided solid dispersing agent such as bentonite, fuller's earth, attapulgite and other clays. Such compositions may contain other finely divided solid carriers such as talc and chalk. In such operations, the solid carrier is mechanically ground with the phenylphenol compound or mixed or wet with a volatile organic solvent solution thereof.

The surface-active dispersing agents are generally employed in the compositions herein described in the amount of from 1 to 20 percent by weight of the combined weight of the agent and phenylphenol compound in the composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

The method of the present invention is carried out by dispersing a growth inhibiting amount of the phenylphenol compounds into the water adjacent to the submersed portions of the plants in a pond, lake, river, canal, stream, ditch, or other water course. This is readily accomplished by introducing the phenylphenol compounds or a composition containing the compounds into the water above the plant mass so as to permit their dispersion in the water adjacent to the growing plants. The introduction of the phenylphenol compounds into the water conveniently may be accomplished by spraying or sprinkling the composition onto or beneath the surface of the water, or metering the composition into the vortex of a rapidly turning propeller to obtain maximum distribution of the compound in the water.

In moving water courses, water flow may be employed to distribute the phenylphenol compounds. Thus, the toxicants may be introduced into the water in such a manner that they are distributed into and over the plant growth area for a sufficient exposure time to kill the plants.

The following examples illustrate the invention but are not to be construed as limiting:

*Example 1*

0.4 part by weight of 4-chloro-2-phenylphenol, 10 parts of an acetone solution containing 0.1 percent by weight of a dimeric alkylated aryl polyether alcohol (Triton X–155), and 90 parts of water were mixed together to produce a liquid water-dispersible concentrate composition. This concentrate was further diluted with water to prepare aqueous compositions containing 400, 200, 100, 50 and 25 parts by weight of toxicant per million parts by weight of ultimate composition. These compositions were employed for the control of *Cabomba caroliniana* (Cabomba, or fanwort), *Anacharis* spp. (waterweed), *Salvinia rotundifolia* (Salvinia) and *Lysimastrum nummularia* (moneywort) growing in a series of small tanks.

In such operations, the aqueous compositions were poured into the tanks to expose the plants to concentrations of 400, 200, 100, 50 and 25 parts by weight of 4-chloro-2-phenylphenol per million parts of water. After one hour of exposure, the tanks were flushed and refilled with fresh water. Thereafter the water was changed daily by overflow filling. Other tanks containing the named plant species were left untreated to serve as checks. At regular intervals, observations were carried out to ascertain what control of the growth had been obtained. Three weeks following the treating operations, the observations showed the control of growth of the named plant species as set forth in the following table.

| Parts by weight of 4-Chloro-2-phenylphenol per Million Parts of Water | Percent Kill of Named Plant Species at Indicated Concentration | | | |
|---|---|---|---|---|
| | Cabomba | Salvinia | Moneywort | Waterweed |
| 400 | 100 | 100 | 100 | 100 |
| 200 | 100 | 100 | 100 | 100 |
| 100 | 100 | 100 | 100 | 100 |
| 50 | 100 | 100 | 100 | 80 |
| 25 | 100 | 100 | 100 | 80 |

At the time of the observations, the untreated check tanks were found to support luxurious and succulent growth of the named plant species.

*Example 2*

In a similar operation, 2-phenylphenol, 4-chloro-3-phenylphenol, and 2,4-dichloro-6-phenylphenol were each employed for the control of Cobomba, Salvinia, moneywort and waterweed. A concentrate composition of each toxicant was prepared in the manner of Example 1, containing 0.4 part by weight of one of the toxicants, 90 parts of water and 10 parts of an acetone solution containing 0.1 percent by weight of Triton X–155. These concentrate compositions were diluted with sufficient water to prepare aqueous compositions containing 400 parts by weight of one of the toxicants per million parts by weight of water. These compositions were employed in exactly the same manner as described in Example 1. The exposure time was 1 hour. Observation of the plants three weeks after treatment showed a substantially complete control of the growth of each of the named species in the treated tanks and luxurious and vigorous growth of the plant species in the untreated checks.

*Example 3*

2,6-dichloro-4-phenylphenol and 4-phenylphenol are mechanically mixed with an alkylated aryl polyether alcohol (Triton X–100) to prepare water-dispersible concentrate compositions containing 75 percent by weight of one of the phenylphenol compounds.

Also, a wettable powder concentrate is prepared by mixing and grinding together 25 parts by weight of 2-chloro-4-phenylphenol, 71 parts by weight of fuller's earth, 2 parts by weight of a substituted benzoid alkyl sulfonic acid (Daxad No. 27) and 2 parts by weight of an alkyl aryl sulfonate (Nacconol NR).

*Example 4*

An emulsifiable concentrate is prepared by mechanically mixing and grinding together 25 parts by weight of 2-chloro-5-phenylphenol with 10 parts by weight of Triton X–155 and 65 parts by weight of xylene.

Also, wettable powder concentrate compositions containing 2-chloro-6-phenylphenol or 3-phenylphenol are prepared by mixing and grinding together 25 parts by weight of one of the phenylphenol compounds, 71 parts of fuller's earth, 2 parts of Nacconol NR and 2 parts of Daxad No. 27.

Similarly, a mixture of 20 parts by weight of 2-chloro-3-phenylphenol, 0.1 part of Nacconol NR, 0.1 part of Daxad No. 27 and 200 parts of water are ball milled together to prepare a water-dispersible liquid concentrate composition.

The concentrate compositions of Examples 3 and 4 or aqueous dispersions thereof in a small quantity of water are adapted to be employed to distribute herbicidal concentrations of the phenylphenol compounds in the water adjacent to aquatic plants.

I claim:
1. A method for inhibiting the growth of aquatic plants which includes the step of introducing into water adjacent the submersed portion of the plants at least 15 parts per million by weight of a chlorinated phenylphenol having from 1 to 2 chlorine atoms in the positions ortho and para to the phenolic hydroxyl.

2. A method for inhibiting the growth of aquatic plants which includes the step of introducing into the water adjacent to the submersed portions of the plants at least 15 parts per million by weight of 4'-chloro-2-phenylphenol.

3. A method for inhibiting the growth of aquatic plants which includes the step of introducing into the water adjacent to the submersed portions of the plants at least 15 parts per million by weight of 4-chloro-3-phenylphenol.

4. A method for inhibiting the growth of aquatic plants which includes the step of introducing into the water adjacent to the submersed portions of the plants at least 15 parts per million by weight of 2,4-dichlorophenylphenol.

References Cited in the file of this patent

UNITED STATES PATENTS

| | | |
|---|---|---|
| 1,950,818 | Schaffer et al. | Mar. 13, 1934 |
| 1,969,963 | Britton et al. | Aug. 14, 1934 |
| 1,989,081 | Christiansen et al. | Jan. 29, 1935 |
| 2,117,796 | Figg | May 17, 1938 |
| 2,600,045 | Blondeau et al. | June 10, 1952 |

OTHER REFERENCES

Martin: "Weeds," vol. 3, April 1954, No. 2, pages 139 to 142.

Osborn: "Weeds," vol. 3, July 1954, No. 3, pp. 231–240.

Thompson et al.: "Botanical Gazette," June 1946, pages 475–507.